(12) United States Patent
Van Lumig et al.

(10) Patent No.: US 8,206,799 B2
(45) Date of Patent: Jun. 26, 2012

(54) AIR-BRAKING SYSTEMS HAVING A STRETCHED PLASTIC TUBE WITH A FITTING INSERTED INTO A STRETCHED END PART OF THE TUBE

(75) Inventors: Lambert Van Lumig, Grathem (NL); Jacob Koenen, Sittard (NL); Dirk G. Blom, Sittard (NL); Paul W. J. Van Den Heuvel, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 638 days.

(21) Appl. No.: 12/160,843

(22) PCT Filed: Jan. 16, 2007

(86) PCT No.: PCT/EP2007/000332
§ 371 (c)(1),
(2), (4) Date: Jul. 27, 2009

(87) PCT Pub. No.: WO2007/082710
PCT Pub. Date: Jul. 26, 2007

(65) Prior Publication Data
US 2011/0177274 A1    Jul. 21, 2011

(30) Foreign Application Priority Data

Jan. 17, 2006 (EP) .................................. 06075114

(51) Int. Cl.
*B29D 22/00* (2006.01)
(52) U.S. Cl. ...................... 428/35.7; 428/36.7; 428/36.9
(58) Field of Classification Search .................. 428/35.7, 428/36.9, 36.91; 138/137
See application file for complete search history.

(56) References Cited

U.S. PATENT DOCUMENTS
5,514,299 A * 5/1996 Kalwara ........................ 252/511
(Continued)

FOREIGN PATENT DOCUMENTS
EP    1 331 087    7/2003

OTHER PUBLICATIONS
International Search Report for PCT/EP2007/000332, mailed May 21, 2007.
(Continued)

*Primary Examiner* — N. Edwards
(74) *Attorney, Agent, or Firm* — Nixon & Vanderhye P.C.

(57) ABSTRACT

The invention relates to a stretched plastic tube obtainable from a polymer composition comprising a copolyester elastomer, and comprising two end-parts and an elongated part between the end-parts wherein at least one end-part is a stretched end-part obtained by mechanically stretching of at least a section of that end part, characterized in that the stretched end-part comprises an outer surface layer area consisting of a first thermoplastic polymer composition (A) comprising a first copolyester elastomer (A-1) and 0-0.2 wt. % carbon black relative to the total weight of the thermoplastic polymer composition (A). The invention also relates to a Plastic tube obtainable from a polymer composition comprising a copolyester elastomer, wherein the plastic tube is a plastic tube comprising: (i) an outer surface layer consisting of a first thermoplastic polymer composition (A) comprising a first copolyester elastomer (A-1) and 0-0.2 wt. % carbon black, relative to the total weight of the thermoplastic polymer composition (A), and (ii) an inner surface layer consisting of a second thermoplastic polymer composition (B) comprising a second copolyester elastomer (B-1), wherein the first thermoplastic polymer composition (A) and the second thermoplastic polymer composition (B) are different.

4 Claims, 1 Drawing Sheet

U.S. PATENT DOCUMENTS

| | | | |
|---|---|---|---|
| 6,207,752 | B1 | 3/2001 | Abraham et al. |
| 7,488,521 | B2* | 2/2009 | Morohoshi et al. .......... 428/36.91 |
| 2004/0058111 | A1 | 3/2004 | Manas-Zloczower et al. |
| 2005/0069702 | A1 | 3/2005 | Morohoshi et al. |
| 2010/0104790 | A1* | 4/2010 | Blom .......................... 428/36.91 |
| 2010/0112261 | A1* | 5/2010 | Van Lumig et al. ........ 428/36.91 |
| 2010/0249287 | A1* | 9/2010 | Schmidt ........................ 524/101 |
| 2011/0177274 | A1* | 7/2011 | Lumig Van et al. ......... 428/36.91 |

OTHER PUBLICATIONS

Written Opinion of the International Searching Authority for PCT/EP2007/000332, mailed May 21, 2007.

Harper, C. A. et al., "Plastics Materials and Processes: A Concise Encyclopedia", John Wiley & Sons, pp. 73-124, (Sep. 11, 2003).

Database WPI, Section Ch, Week 199420, Derwent Publications Ltd. (1994), JP 19910352144.

\* cited by examiner

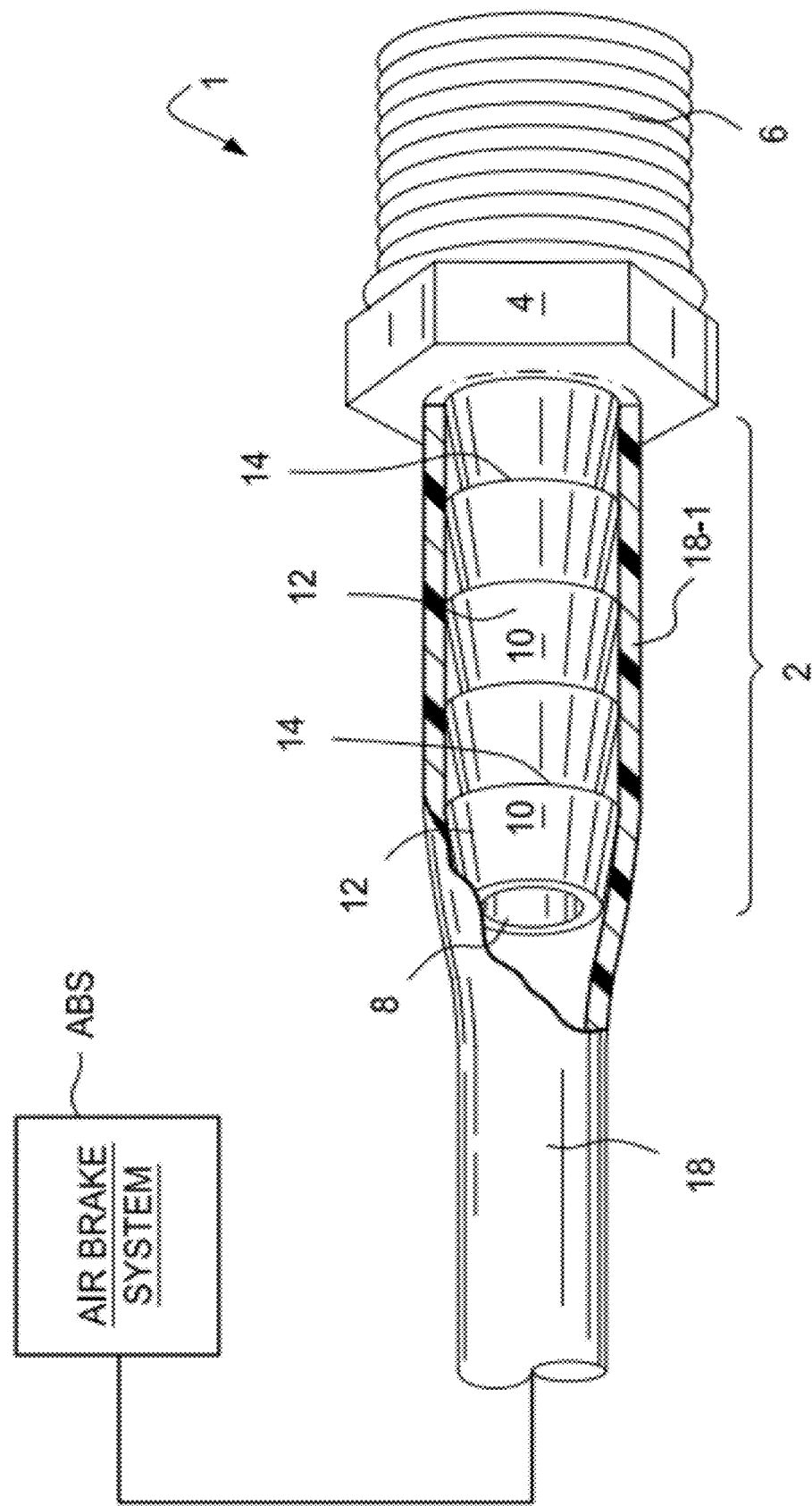

AIR-BRAKING SYSTEMS HAVING A STRETCHED PLASTIC TUBE WITH A FITTING INSERTED INTO A STRETCHED END PART OF THE TUBE

This application is the U.S. national phase of International Application No. PCT/EP2007/000332, filed 16 Jan. 2007, which designated the U.S. and claims priority to Europe Application No. 06075114.6, filed 17 Jan. 2006, the entire contents of each of which are hereby incorporated by reference.

FIELD

The invention relates to a plastic tube suitable for use in automotive air-brake systems. The invention more particularly relates to a stretched plastic tube obtainable from a polymer composition comprising a polyester elastomer. The invention also relates to a plastic tube obtainable from a polymer composition comprising a polyester elastomer, from which a stretched plastic tube according to the invention can be made.

BACKGROUND AND SUMMARY

In the context of the present invention with the term polyester elastomer is understood a block copolymer containing hard segments consisting of blocks of a high-melting crystalline or semi-crystalline aromatic or semi-aromatic polyester and soft segments consisting of blocks of a low-melting polymeric component. Such polyester elastomers are also known as TPE-E and copolyester block copolymers.

A tube typically comprises two end-parts and an elongated part between the two end-part. A tube comprising at least one stretched end-part obtained by mechanically stretching of at least a section of that end-part, is herein considered to be a stretched plastic tube. The elongated part and optionally one of the end-parts do not have to be subjected to mechanically stretching.

Basic requirements for plastic tubes used in automotive air-brake systems are that these tubes have a proper balance in flexibility and rigidity, are sufficient temperature resistance, and are resistant against the chemical environment present under the engine hood in cars. Conventionally, these tubes were made of polyamide 12. Amongst others due to the trend towards more compact cars, higher temperatures are generated in the automotive engine section, which made the use of polyamide 12 in this application critical. In view thereof, a search was made for better performing materials. As a replacement material, polyester elastomers have found their way into this application, because of their better performance (stiffness) at higher temperatures. The polyester elastomers used in plastic tubes for automotive air-brake systems are black, carbon black filled materials, like many other plastic materials used for other automotive under-the-bonnet applications. These polyester elastomer materials in general also show a good resistance against environmental influences like ozone. It has been observed however, that for more demanding situations, the ozone resistance of the airbrake tubes made of the said polyester elastomers is not sufficient, and the tubes can show environmental stress cracking when subjected to an environment comprising ozone. The said mechanical stress cracking can occur where the tubes are subjected to mechanical stretching prior to mounting the tubes to an engine block or to a brake system. Such a mechanical stretching occurs for example, when a barbed hose fitting or other type of hose fitting comprising thicker parts, is inserted in an end-part of the plastic tube. A barbed hose fitting is a hose fitting comprising backward projecting thickenings, intended to prevent easy extraction of the hose fitting from the tube. Fittings are needed for the mounting step. Barbed hose fittings can be produced and mounted economically and therefore are applied more and more. For that reason there is a need for plastic tubes, suitable for use in automotive air-brake systems, which are more ozone resistant.

The aim of the invention is therefore to provide a plastic tube, and more particular a stretched plastic tube, which has improved ozone resistance compared to the known plastic tubes obtainable from a polymer composition comprising a polyester elastomer.

This aim has been achieved with the stretched plastic tube according to the invention, wherein the stretched end-part comprises an outer surface layer area consisting of a first thermoplastic polymer composition (A) comprising a first copolyester elastomer (A-1) and 0-0.2 wt. % carbon black relative to the total weight of the thermoplastic polymer composition (A). Meanwhile, the stretched plastic tube comprises an inner surface layer consisting of a second thermoplastic polymer composition (B) comprising a second copolyester elastomer (B-1) and comprising more than 0.2 wt. % carbon black, relative to the total weight of the thermoplastic polymer composition (B).

BRIEF DESCRIPTION OF THE DRAWING

FIG. 1 is a schematic three-dimensional elevational view of a braking system which includes a cylindrical barbed hose fitting inserted into a stretched end-part of a plastic tube.

DETAILED DESCRIPTION

The effect of the stretched plastic tube according to the invention, wherein the at least stretched end-part comprises an outer surface layer area as mentioned here above, is that the stretched plastic tube has a better ozone resistant, demonstrated by a reduced tendency to shows environmental stress cracking in an ozone containing environment, than the known stretched plastic tube made of a carbon-black filled polyester elastomer. The observed effect is in particular surprising since carbon black is known to act, for example, as UV stabilizer in many materials.

The ozone resistance can be tested by subjecting stretched plastic tubes to an ozone containing environment, as is described, for example in ISO 1431, which relates to resistance to ozone cracking of vulcanized and thermoplastic rubbers, and din 53509-1, which relates to: "Bestimmung der Bestandigkeit gegen Rissbildung unter Ozone Einwirkung" (Determination of resistance against cracking under the influence of ozone).

The carbon black content in a thermoplastic polymer composition can suitably be determined with TGA measurements, for example with the method according to ASTM 5630, performed in an oxygen free, and subsequently in an oxygen containing environment.

Suitably, the complete stretched plastic tube comprises an outer surface layer consisting of the first thermoplastic polymer composition (A). In this stretched plastic tube the outer surface layer area at the end part forms an integral part of the outer surface layer. This has the advantage that the ozone resistance of the stretched plastic tube as a whole is improved.

A stretched plastic tube comprising an outer surface layer consisting of the first thermoplastic polymer composition (A) can be made of a plastic tube comprising:

a. an outer surface layer consisting of a first thermoplastic polymer composition (A) comprising a first copolyester elastomer (A-1) and 0-0.2 wt. % carbon black, the wt. % relative to the total weight of the thermoplastic polymer composition (A), and b. an inner surface layer consisting of a second thermoplastic polymer composition (B) comprising a second copolyester elastomer (B-1), wherein the first thermoplastic polymer composition (A) and the second thermoplastic polymer composition (B) are different.

A plastic tube comprising an outer surface layer and an inner surface layer consisting of the said different compositions will herein also be denoted as a "composite plastic tube". The invention also relates to the composite plastic tube described above.

The outer surface layer and the inner surface layer in the composite plastic tube according to the invention consist of different copolyester elastomer compositions differing in carbon black content, i.e. the second thermoplastic polymer composition (B) comprises more than 0.2 wt. % carbon black, relative to the total weight of the thermoplastic polymer composition (B).

The compositions may further be different in that the first copolyester elastomer (A-1) and the second copolyester elastomer (B-1) are different.

Suitably, copolyester elastomer (A-1) is a copolyester elastomer that is more ozone resistant than second copolyester elastomer (B-1). Also suitably, the second thermoplastic polymer composition (B) is a coloured composition, or a coloured composition having a colour different from composition (A). Also suitably, these variants can be combined.

In case the second thermoplastic polymer composition (B) is a coloured composition, it may comprise any colouring agent that is suitable for use in tubes in automotive airbrake systems. Suitably, the colouring agent is a colorant or a pigment. A colorant is herein understood to be a colouring agent that is soluble or molecularly dispersible in copolyester elastomer and a pigment is herein understood to be a solid colouring agent that is not soluble or molecularly dispersible in copolyester elastomer. An example of a suitable pigment is carbon black. An example of a suitable colorant is aniline black, which is known under the generic name nigrosine. Nigrosine is a commercial product supplied by different suppliers (e.g. PD Industries, Maharashtra, India; Lanxess, Pennsylvania, USA; Royce Associates, New Jersey, USA; and Anirox Pigments Ltd, West Bengal, India) and comes in different variants, such as water soluble nigrosine, oil soluble nigrosine and alcohol solube nigrosine. Preferebly the colorant is an oil soluble nigrosine.

In case the thermoplastic polymer composition (B) comprises carbon black, it preferably comprises the carbon black in an amount of less than 2 wt %, more preferably 0.01-1.5 wt %, or even 0.1-1.0 wt. %, relative to the total weight of the thermoplastic polymer composition (B).

The outer surface layer in the composite plastic tube according to the invention can have a thickness varying over a large range. Preferably, the outer surface layer has a thickness of at least 0.025 mm, more preferably at least 0.05 mm and still more preferably at least 0.1 mm. A larger thickness for the outer surface layer has the advantage that the ozone resistance is further enhanced.

Also preferably, the outer surface layer has a thickness of at most 0.5 mm, more preferably at most 0.25 mm. This has the advantage that the composite plastic tube has a less dull, more intense colour in case the first thermoplastic polymer composition (A) in the composite plastic tube is a non-coloured composition and the second thermoplastic polymer composition (B) is a coloured composition.

The composite plastic tube according to the invention may further comprise, next to the inner surface layer (a) and the outer surface layer (b), at least one inter layer (c), laying in between the outer surface layer and the inner surface layer, and consisting of a polymer composition (C) being different form (A) and (B).

The polymer composition (C) may comprise or consist of a thermoplastic polymer composition comprising copolyester elastomer. It may as well comprise or consist of another composition, as long as this does not eliminate the ozone resistant properties of the composite plastic tube according to the invention.

The composite plastic tube according to the invention can be made with a process comprising a co-extrusion step. In such a process, two or more materials are extruded through a single die with two or more orifices arranged so that the extrudates merge and weld together into a single product, in the case of the present invention, the product being a tube. The said process may optionally comprise a shaping step. In such a shaping step the composite plastic tube can be given a form with an elongated part comprising various bendings and/or curves suitable for the targeted automotive brake system. The shaping step may be performed by any shaping process that is suitable for bending and shaping plastic tubes. Suitably, the shaping step is a heat-shaping step, i.e. a shaping step wherein the shaping process involves heating, deformation and subsequently cooling, of the plastic tube.

The invention therefore also relates to a process for making a composite plastic tube according to the invention comprising a co-extrusion step, and optionally a (heat)-shaping step.

The stretched plastic tube according to the invention can also be made of a plastic tube integrally consisting of the thermoplastic polymer composition (A). This has the advantage that the stretched plastic tube has a further improved ozone resistance.

The copolyester elastomer that can be used as the first copolyester elastomer (A-1) in both the composite plastic tube and integral plastic tube, and the second copolyester elastomer (B-1) in the composite plastic tube, each as well as in the stretched plastic tube made of these tubes, may be any copolyester elastomer that is suitable for use in plastic tubes. Suitably, the copolyester elastomer comprises, or is, a copolyether ester elastomer, a copolyester ester elastomer or a copolycarbonate ester elastomer, or a mixture thereof.

With a copolyether ester elastomer is herein understood a block copolymer containing hard segments consisting of blocks of a high-melting crystalline or semi-crystalline aromatic or semi-aromatic polyester and soft segments consisting of blocks of a low-melting polyether. Suitably, the copolyether ester elastomer is made of hard polyester segments made up of repeating units derived from an aromatic dicarboxylic acid and an aliphatic diol, and of soft segments made up of polyglycolethers, also known as poly(alkylene oxides). Examples of poly(alkylene oxides) that are suitable soft segments in the copolyether ester elastomer are poly(ethylene oxide), polypropylene oxide) and poly(tetramethylene oxide), and random copolymers and block-copolymers thereof.

Preferably, the soft segment in the copolyether ester elastomer is made up of poly(tetramethylene oxide). A comprehensive description of copolyether ester elastomers and their preparation can be found in Encyclopedia of Polymer Science and Technology, Volume 12, pages 76-177 (1985) and the references reported therein.

With a copolyester ester elastomer is herein understood a block copolymer containing hard segments consisting of blocks of a high-melting crystalline or semi-crystalline aromatic or semi-aromatic polyester and soft segments consisting of blocks of a low-melting polyester diol. Suitably, the copolyester ester elastomer is made of hard polyester segments made up of repeating units derived from an aromatic dicarboxylic acid and an aliphatic diol, and of soft segments made up of either an aliphatic diol and an aliphatic dicarboxylic acid or a lactone, or a combination thereof, wherein the hard segments and the soft segments can be connected with a urethane group. Copolyester ester elastomers as well as the preparation thereof, are described, for example, in European patent EP-0102115-B1.

With a copolycarbonate ester elastomer is herein understood a block copolymer containing hard segments consisting of blocks of a high-melting crystalline or semi-crystalline aromatic or semi-aromatic polyester and soft segments consisting of blocks of a low-melting polycarbonate containing polymeric component. Suitably, the copolycarbonate ester elastomer is made of hard polyester segments made up of repeating units derived from an aromatic dicarboxylic acid and an aliphatic diol, and of soft segments made up of repeating units of an aliphatic carbonate, and/or soft segments made up of randomly distributed repeating units of an aliphatic carbonate and either an aliphatic diol and an aliphatic dicarboxylic acid or a lactone, or a combination thereof, wherein the hard segments and the soft segments can be connected with a urethane group. Copolycarbonate ester elastomers as well as the preparation thereof, are described, for example, in European patent EP-0846712-B1.

The aromatic dicarboxylic acid in the hard segments of the copolyester elastomer can be, for example, terephthalic acid, naphthalene dicarboxylic acid and biphenyl dicarboxylic acid, or a mixture thereof. The aliphatic diol can be, for example, ethylene diol (also known as ethylene glycol), propylene diol, butylene diol (also known as 1,4-butane diol), hexamethylene diol, or a mixture thereof. The hard segments in the copolyester elastomer in the first thermoplastic polymer composition (A), and where applicable, the second thermoplastic polymer composition (B), are preferably made up of repeating units derived from an aromatic dicarboxylic acid comprising terephthalic acid and an aliphatic diol comprising ethylene glycol and/or 1,4-butane diol. More preferably, the hard segments are made of terephthalic acid and 1,4-butane diol.

The copolyester elastomer in the first thermoplastic polymer composition (A) preferably is a copolycarbonate ester elastomer or a copolyester ester elastomer, more preferably a copolycarbonate ester elastomer. The advantage thereof is that the ozone resistance is even further improved.

The first thermoplastic polymer composition (A) as well as the second thermoplastic polymer composition (B) may comprise, next to the copolyester elastomer, also other components. The components that may be present can be any additive that is suitable for use in a plastic tube for air brakes. Suitably, the first thermoplastic polymer composition (A), and/or the second thermoplastic polymer composition (B), comprises at least one additive chosen from the group consisting of stabilizers, colorants and processing aids, more preferably at least a stabilizer, and still more preferably an anti-ozonant. Suitable processing aids include lubricants and release agents. Examples of suitable stabilizers are UV stabilizers, heat stabilizers, anti-oxidants and anti-ozonants. Examples of suitable anti-ozonants are substituted p-phenylenediamines (e.g. N,N'-diphenyl-p-diphenylenediamine), cyclic acetals (e.g. Vulkazon® AFS/LG) and enol ethers (e.g. Vulkazon® AFD).

A suitable colorant is, in particular for the first thermoplastic polymer composition (A), but also for the second thermoplastic polymer composition (B), is nigrosine. Nigrosine is advantageously applied, when the plastic tubes have to be made in black. With nigrosine in at least the outer surface layer a black plastic tube can be made with better ozone resistance than a corresponding black plastic tube with carbon black in at least the outer surface layer.

In another embodiment of the invention, the stretched plastic tube is made of a carbon-black free composite plastic tube with an inner surface layer comprising nigrosine and an outer surface layer consisting of a non-coloured thermoplastic polymer composition.

The composite plastic tube according to the invention and preferred embodiments thereof, as well as the plastic tube integrally consisting of the thermoplastic polymer composition (A), can be converted into a stretched plastic tube according to the invention with a process comprising a stretching step, i.e. a step wherein at least one end-part is subjected to mechanical stretching. The said mechanical stretching may be accomplished, for example, with inserting a hose fitting having a part that is inserted into the tube having an outer diameter larger than the inner diameter of the plastic tube. The hose fitting may be any type of tubular fitting that is suited for mounting an airbrake system tube to an engine. Suitably, the hose fitting is a cylindrical hose fitting or a conical hose fitting. Also suitably, the hose fitting comprises tapered segments, i.e. segments that gradually increase or diminish in size in the elongated direction of the fitting. Suitably, the tapered segments have a barb shape, i.e. have a sharp edge projecting backward from that end of the hose fitting that is intended to being inserted into the tubes.

As a result of the said mechanical stretching the stretched end-part comprises a stretched section having a diameter that is larger than the diameter of the elongated part of the plastic tube and the end-part prior to stretching. Suitably, the elongated part has a first outer diameter $D1$ and the stretched end-part comprises a stretched section having a second outer diameter $D2$, $D2$ being at least 1% larger than $D1$. Preferably $D2$ is at least 2%, more preferably at least 5%, or even at least 10% larger than $D1$. $D2$ might even be at least 20% larger than $D1$. The larger the difference between $D1$ and $D2$ is, the more pronounced the improvement in ozone resistance according to the invention is.

The composite plastic tube according to the invention may have a first outer diameter ($D1$) varying over a large range, and may be as low as, for example, 3 mm and even lower, and as large as, for example, 25 mm, and even larger. For automotive applications, the diameter is preferably in the range of 5-20 mm, more preferably of 8-15 mm, or even in the range 10-12.5 mm. Generally, the smaller $D1$ is, the larger increment in $D2$ will be in practice, and the larger the effect according to the invention will be.

The stretched plastic tube according to the invention may also have a wall thickness (T) varying over a large range. Suitably, the stretched plastic tube has a wall thickness of at least 0.2 mm, preferably 0.5-3 mm, or even 1-2 mm.

The invention also relates to a process for making a stretched plastic tube according to the invention. The process according to the invention comprises a stretching step. The stretching step may be integrated in the process for making the plastic tube, resulting in a process comprising in this order, a (co)extrusion step, optionally a (heat) shaping step, and a stretching step.

The invention also relates to an airbrake tubing system, comprising a stretched plastic tube according to the invention, or any preferred embodiment thereof, and a hose fitting inserted into the stretched end-part.

The invention also relates to an airbrake system comprising an airbrake tubing system according to the invention. Suitably, the airbrake system is a vacuum airbrake system or a pressure airbrake system.

FIG. 1 is a schematic view of an air brake system (ABS) and shows a schematic three-dimensional elevational view of a cylindrical barbed hose fitting (1). The cylindrical barbed hose fitting (1) comprises a cylindrical part (2), a central part (4) and a threaded part (6). The cylindrical part (2) has an end (8) and comprises several individual tapered barbed segments (10) recognizable by a gradual diminishing diameter (12) and a sharp edge (14) pointing away from the end (8). A stretched plastic tube having two end parts (one of which is shown in FIG. 1 by reference (18-1)) and a stretched part (18) between the end parts (18-1). The cylindrical part (2) of the barbed hose fitting (1) is inserted into a stretched end part (18-1) of a stretched plastic tube of the air brake system (ABS). A similar cylindrical part (2) may be inserted into the opposite stretched end part of the plastic tube.

The invention claimed is:

1. An airbrake system, comprising:
a stretched plastic tube formed of a polymer composition comprising a copolyester elastomer, wherein the stretched plastic tube includes end parts and an elongated part between the end parts, at least one of the end parts being a stretched end-part which is obtained by mechanically stretching at least a section of the at least one end part of the elongated part; and
a hose fitting inserted into the stretched end-part, wherein the stretched end-part comprises an outer surface layer area consisting of a thermoplastic polymer composition (A) comprising a first copolyester elastomer (A-1) and 0-0.2 wt. % carbon black, the wt. % being relative to the total weight of the thermoplastic polymer composition (A).

2. The airbrake system according to claim 1, wherein the stretched plastic tube consists integrally of the thermoplastic polymer composition (A).

3. The airbrake system according to claim 1, wherein the first copolyester elastomer (A-1) consists of a copolyether ester elastomer, a copolyester ester elastomer, a copolycarbonate ester elastomer, or a mixture thereof.

4. The airbrake system according to claim 1, wherein the first thermoplastic polymer composition (A) further consists of at least one additive chosen from the group consisting of stabilizers, colorants, and processing aids.

* * * * *